United States Patent Office 2,963,901
Patented Dec. 13, 1960

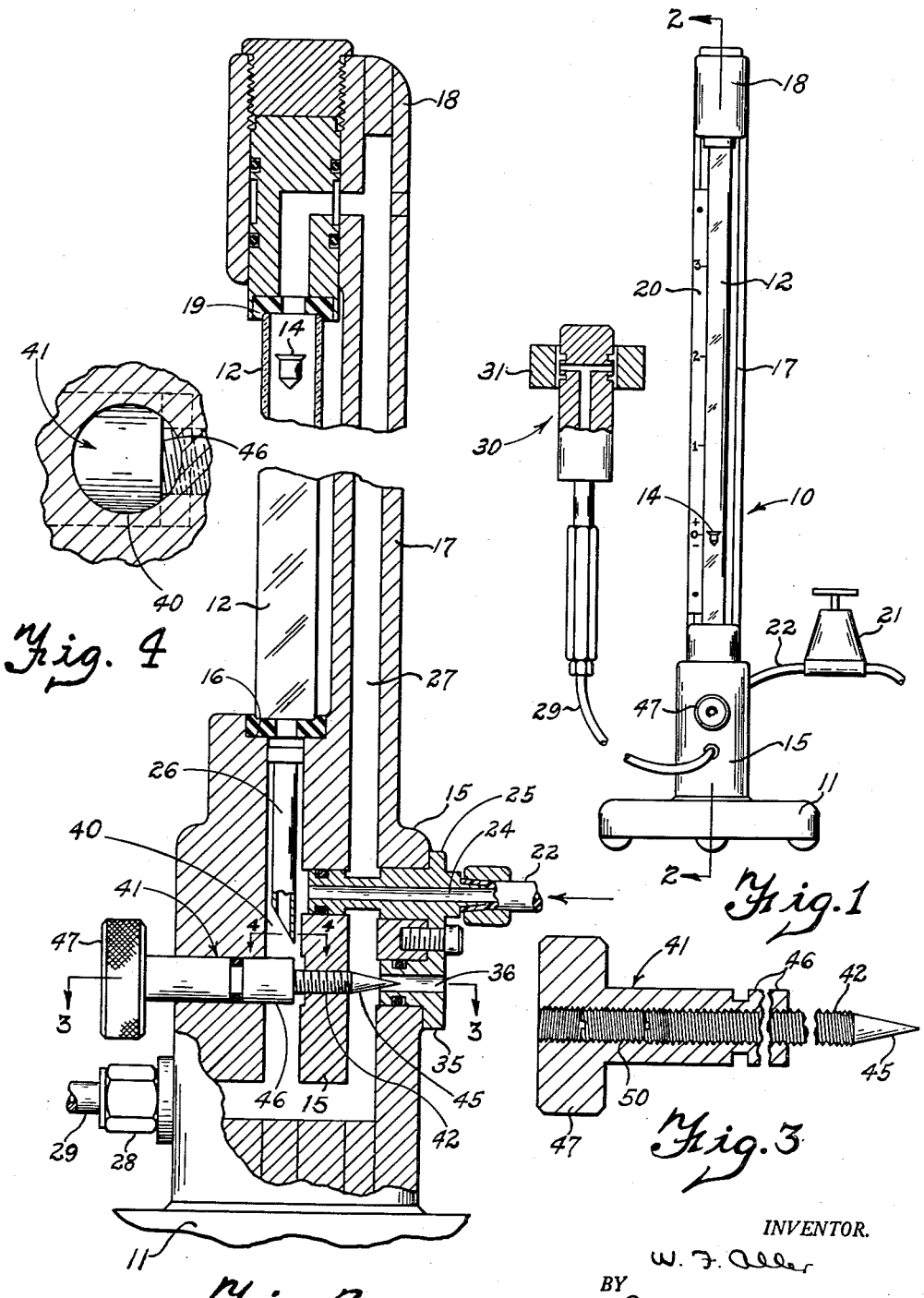

2,963,901

GAGE WITH COORDINATED ADJUSTMENTS

Willis Fay Aller, Dayton, Ohio, assignor, by mesne assignments, to The Sheffield Corporation, a corporation of Delaware Filed Aug. 10, 1955, Ser. No. 527,531

6 Claims. (Cl. 73—37.5)

This invention relates to gaging devices and more particularly to precision gages of the air leakage type for gaging product characteristics.

Air gages for precision measurement of a size or other characteristic of an object have been used in which there is provision for amplification adjustment so that a desired tolerance spread can be made to coincide with the scale range on the instrument. This is required because after a period of use there is some wear that takes place in the gage head causing a change in the instrument amplification. For example, where the instrument is one having a tube provided with a tapered flow passage and the rate of air flow controlled by the leakage through an air jet or jets in a gage head and controlled by the workpiece determines the position of an indicator or float along the tube, there may be a float movement range of five inches along the tube to correspond with a size differential in the workpiece of five thousandths of an inch when the gage head is new. After a period of time, however, the same workpiece size differential may give only a range of four and a half inches due to the wear that takes place in the gage head and it is necessary then to adjust the amplification of the instrument so that it will again give a five-inch movement for this particular size differential in the workpiece.

This adjustment may be accomplished by bypassing some portion of the air supplied to the instrument directly to the gage head so that it does not go through the flow tube. When this adjustment is made it affects the level of the float along the tube so it is then necessary to have an adjustment for the float level. In making these adjustments, since one affects the other, it has been necessary to adjust first one and then the other until both the float level and the amplification are exactly what is required.

In making these adjustments in dimension gaging it is customary to use large and small masters or standard parts, the sizes of which correspond to the upper and lower acceptable sizes for the part. These masters, which must be very precisely made, are, of course, expensive. Attempts have been made to use a single master having the nominal size of the part but reliable results have not been obtained in this way since the amplification of the gage changes as wear takes place in the gage head and no provision has been made for detecting and correcting such a condition. This gives an incorrect reading if the part is oversize or undersize although it permits adjustment of the gage to the nominal size itself.

In accordance with the present invention however, a single master can be used to calibrate the gage precisely when adjustments are made for amplification or float level. This is accomplished in a novel manner by coordinating the amplification adjustment with the float level adjustment and connecting them together. The operator then by merely adjusting a single adjustment member may cause the indication produced by the float to precisely correspond with the size of a single master used for calibrating purposes and this will give a predetermined precise amplification adjustment. One master instead of two can thus be used in precisely adjusting the gage so that the size indications will be exact throughout the length of the scale.

Accordingly one object of this invention is the provision of an air gage in which only a single master is required for setting purposes and in which amplification adjustments can be made so that the size indications along the length of the scale employed are precise.

Another object of the invention is the provision of an air gage having interconnected amplification and zero setting means and in which the amplification and zero setting means are so coordinated with one another as to permit accurate calibration merely by using a single master of known size.

Another object is to provide an air gage for use with a gage head having at least one leakage orifice controlled by the work to be gaged wherein changes in amplification of the system due to gage head wear are automatically compensated for when the gage indicator is adjusted to a reference indication through use of a single easily made adjustment and with a single master in association with the gage head.

Another object is to provide a gaging device of the type having an indicating float movable along an internally tapered flow tube connected at its lower end to a supply of air under a predetermined pressure and at its upper discharge end to a gaging head wherein the flows through a bypass from supply to discharge and from the discharge end of the tube directly to atmosphere are controlled by interconnected adjustments which are so coordinated as to automatically maintain a desired relationship between amplification and float position whereby a given float position corresponds to a given amplification.

Other objects and advantages of the invention will be apparent from the following description, the appended claims, and the accompanying drawing, in which, Figure 1 is a view in elevation of a gaging device embodying the features of the present invention shown connected to a source of air under regulated pressure and to a gaging head illustrated in partial central section, Figure 2 is a sectional view taken on line 2—2 of Figure 1, Figure 3 is an enlarged sectional view of the adjustable valve unit taken on line 3—3 of Figure 2, and, Figure 4 is a sectional view on an enlarged scale, on line 4—4 of Figure 2.

For illustrative purposes, the invention has been shown as embodied in an instrument of the air flow type connected to a gaging head for measuring the internal dimension of a hole in a part. This instrument is of the type wherein an indicating float is positioned along a vertically disposed internally tapered transparent flow tube in accordance with the velocity of flow upward through the tube as determined by the leakage through a gaging head associated with the product to be gaged. The indicating tube in such a device is connected at its lower end to a supply passage leading from a source of air under controlled pressure and at its upper end to a discharge passage adapted for connection to a gaging head. An adjustable relief directly to atmosphere is provided in the discharge passage through which a predetermined amount of air can be bled so that the position of the float along the tube or "zero setting" can be adjusted during setup. An adjustable bypass is provided between the supply and discharge passages to vary the proportion of air bypassed around the tube directly to the gaging head, thus providing an amplification adjustment for the device.

In conventional instruments of this nature the amplification and float position or "zero setting" adjustments are independently made and the float level will also be changed by an amplification adjustment. With such an arrangement in dimension gaging for example, it is necessary to apply a pair of masters having a predetermined difference in dimension to the gage head in order that the amplification and float position of the device can be checked and adjusted. During setup the masters would be alternatively applied and amplification and float position adjustments relatively adjusted until the indicating float arrives at two desired positions along the tube and with respect to predetermined calibrations along an associated scale with the different sized masters in association with the gaging head. In some other instruments employing different circuiting a single master is provided but no provision is made for detecting and compensating for changes in amplification of the system due to wear and other conditions and continued precision gaging cannot be relied upon.

With the present invention the two adjustments are co-ordinated and interconnected for simultaneous adjustment in a predetermined manner. Only a single master is required. With the master in association with the gage head, a single adjustment is made to bring the float to the level indicating the master dimension and the amplification is simultaneously accurately adjusted to a proper value, automatically compensating for gage head wear. Through this arrangement only a single master is required along with a single easily made adjustment rather than a pair of masters and juggling of adjustments during the alternative application of the masters to the gauge head, as previously required. Should gage head wear or other factors cause amplification to change this can be simply detected and compensated for by reapplying the single master and using the single adjustment to bring the float to its previous level.

In the illustrated device a support 10 mounted on a base 11 carries an internally tapered transparent flow tube 12 in a vertical position. An indicating float 14 moves to positions along the internal taper in accordance with the velocity of fluid flow upward through the tube. The support 10 has a lower portion 15 providing a seat 16 for the lower end of the flow tube. The support also includes an intermediate portion 17 and an upward portion 18 which includes an adjustable seat 19 for the upper end of the flow tube. A calibrated scale 20 is carried along side the flow tube 12.

Air under pressure supplied from a suitable source passes through pressure regulator 21, tube 22, and a supply passage 24 leading through a coupling 25 and an insert 26 to the lower end of the flow tube. A discharge passage 27 communicating with the upper end of tube 12 is formed integrally in the support 10 and leads through a coupling 28 at the forward face of the lower support portion 15 to a tube 29 and a gage head 30.

A predetermined air supply pressure can be maintained by a suitable regulator. Various methods are available for checking the pressure and for that reason specific illustration has been omitted. A calibrated pressure indicator of good accuracy can be used or a reference plug similar to that disclosed in Patent No. 2,909,920 issued October 27, 1959, can be provided for connection to the instrument outlet. Such a plug could contain two restrictions of predetermined size through which flow could be alternately directed to obtain two different discharge flow conditions from the instrument. By adjusting the single instrument adjustment and the regulator so that the float arrives at predetermined upper and lower points with the respective flow conditions obtained, the pressure is precisely adjusted and the operation of the instrument checked.

The exemplary gage head 30 has opposed leakage orifices for diameter measurement and is shown in association with a master 31. Thus air under pressure passes through the supply passage 24, upward through flow tube 12 where it is effective upon float 14, and down through discharge passage 27 and to atmosphere through the openings of gage head 30 as restricted by the master dimension.

An insert 35 in the lower support portion 15 provides a valve opening 36 through which air can be bled from discharge passage 27 and through passage 36 to atmosphere. A bypass passage 40 communicates between supply passage 24 and the lower portion of discharge passage 27 to bypass a controlled proportion of the supplied air directly to the gaging head and around the flow tube, thus providing a control of the amplification of the device.

A valve unit 41 is carried in lower support portion 15 transverse the parallel bypass and discharge passages. The valve unit is adjustably slidable transverse the passages by means of an inner portion 42 threaded into the support and provides a first valve portion 45 cooperating with opening 36 to control the flow through the relief to atmosphere from discharge passage 27, and at 46 a cylindrical portion of the unit acts to control the flow through the bypass 40. Upon rotation of knurled knob 47 valve unit 41 will slide transversely within support portion 15 and concurrently control the relief to atmosphere through opening 36 and the bypass through passage 40 from supply to discharge.

The two valve portions are so coordinated with respect to one another as to obtain the desired interrelationship. Thus the taper of portion 45, and its position relative to the controlling end of portion 46 are so designed with respect to one another as to obtain the necessary relationship between amplification and float position or zero adjustment. This interrelationship can be adjusted as desired in various ways, as for example, machining off the inner end of insert 36 will increase the clearance relative to valve portion 45; however, as shown here the valve portions are relatively adjustable. Thus valve portion 45 can be adjusted relative to valve portion 46 by turning the screw within the unit body and then locking it in position by means of a set screw 50. This allows a relative adjustment of the amplification controlling surface 46 and the relief controlling surface 45 as desired.

On the device shown with increased wear on the orifices of the gage head 30, amplification decreases and the float will have a higher position in the tube. By applying the single master 31 to the gage head 30 and using the single adjustment 47 provided by the present invention, as the float 14 is brought to the correct point along tube scale 20 for the dimension of the master 31 the amplification by-pass is automatically restricted to compensate completely or partially for the tooling wear and give a restored correct amplification with the float at a given height in the tube.

While the form of apparatus herein described constitutes the preferred embodiment of the invention, it is to be understood that the invention is not limited to this precise form of apparatus, and that changes may be made therein without departing from the scope of the invention as defined in the appended claims.

What is claimed is:

1. An air gage having an indicator operable along a scale and adapted for connection to a gage head for gaging a dimension or other product characteristic and to a source of air under controlled pressure, adjustable valve means for directly controlling the gage amplification means while indirectly changing the response position of the indicator along said scale, adjustable valve means for directly controlling the response position of said indicator, and means interconnecting both said adjustable means for simultaneous adjustment so coordinated as to automatically compensate for changes in indicator response position normally resulting from changes in amplification adjustment, said interconnecting means including setting means for adjustably fixing the relationship between said adjustable means, whereby gage amplification and indicator position are simultaneously adjusted in a predetermined relationship and the gage can be set as to both amplification and indicator position with only a single master of known dimension.

2. An air gage of the character described comprising an internally tapered transparent flow tube containing an indicating float movable along the tube in accordance with the rate of flow through the tube, a base, means on said base mounting said flow tube in a vertical position, a supply passage connected to the lower end of said flow tube and adapted for connection to a source of fluid under controlled pressure, a discharge passage connected to the upper end of said flow tube and adapted for connection to a gage head, a bypass passage communicating between said supply passage and said discharge passage, a relief passage communicating with the upper end of the flow tube leading to atmosphere, a first valve means in said bypass passage for adjustably controlling the amount of fluid passed directly from said supply passage to the gage head to directly control amplification of the gage while simultaneously indirectly changing the float position along said tube, a second valve means in said relief passage for adjustably bleeding fluid to atmosphere for directly controlling float position, and manually adjustable means interconnecting said first and second valve means for adjustment to simultaneously increase or decrease the flow through both the relief and bypass passages in a predetermined relationship such as to compensate for changes in float position resulting from changes in flow through the bypass passage and automatically provide a predetermined gage amplification with a given position of the indicating float along the tube.

3. An air gage of the character described comprising a vertically disposed internally tapered transparent flow tube, a float operative in said tube and movable therealong in accordance with the velocity of flow upward therethrough, a supply passage connected to the lower end of said tube and adapted for connection to a source of fluid under controlled pressure, a discharge passage connected to the upper end of said flow tube and adapted for connection at its outer end to a gaging head, a bypass passage communicating between said supply and discharge passages, a relief passage communicating with said discharge passage and leading to atmosphere, an adjustable valve member having portions operative in both said bypass and said relief passages to simultaneously control the flow therethrough in a predetermined relationship such as to automatically provide a predetermined amplification with a given position of the float along the tube.

4. An air gage of the character described comprising an internally tapered transparent flow tube, a float moveable along the tube in accordance with the rate of flow upward therethrough, a supply passage connected to the lower end of said tube and adapted for connection to a source of air under controlled pressure, a discharge passage connected to the upper end of the flow tube and adapted for connection at its outer end to a gage head, a bypass passage communicating between said supply passage and said discharge passage, a relief passage communicating with said discharge passage and leading to atmosphere, an adjustable valve unit including a first portion operable in said bypass passage to vary the flow therethrough and adjust the amplification of the gage, and a second portion operative in the relief passage to vary the exhaust therethrough and adjust the position of the float within the flow tube during setup, said valve unit having provision for adjusting the valve portions to different relative positions, and means for adjustably positioning the valve unit as a whole within the gage for simultaneously controlling the flow through the bypass and relief passages in a predetermined manner so as to automatically provide a given amplification with the indicating float at the same predetermined level in the tube.

5. An air gage of the character described comprising a vertically disposed internally tapered transparent flow tube, containing a float movable along the tube in accordance with the rate of flow through the tube support means for said tube above, said support including an upper portion having seating means for the upper end of the flow tube and a lower portion including seating means for the lower end of the flow tube, said lower portion having passages formed therein; said passages comprising, a supply passage communicating with the lower end of the flow tube through the lower seating means and adapted for connection to a supply of air under controlled pressure, a discharge passage in communication with the upper end of the flow tube and opening through the forward face of the lower support portion for connection to a gage head, a bypass passage communicating between said supply passage and said discharge passage and paralleling a lower portion of the discharge passage, said discharge passage having an opening through one side thereof in its lower portion leading to atmosphere; and an adjustable valve unit extending transversely through the lower portion of the support and including a first portion operative within the bypass passage and a second portion operative to control the flow through the opening through the side of the discharge passage, whereby upon adjustment of the valve unit interrelated adjustments of the flow through the bypass passage and relief opening are obtained in a predetermined manner such as to automatically vary the flow through the bypass passage as the relief to atmosphere is varied to automatically provide a predetermined gage amplification with the float at a given height in the tube.

6. An air gage having an indicator operable along a scale and adapted for connection to a gage head for obtaining amplified indicator responses as determined by a dimension or other product characteristic and to a source of air under controlled pressure, said gage comprising a first adjustable valve means in said gage for changing the response position of said indicator along said scale, a second adjustable valve means in said gage for directly controlling the amplification of the gage while indirectly changing the response position of said indicator, connection means interconnecting and coordinating said first and second adjustable valve means for simultaneous adjustment in a predetermined relationship so as to automatically compensate for changes in indicator response position normally resulting from changes in amplification adjustment whereby the gage can be set as to both amplification and indicator position with only a single master of known dimension.

References Cited in the file of this patent

UNITED STATES PATENTS

| | | |
|---|---|---|
| 1,846,946 | Brown et al. | Feb. 23, 1932 |
| 2,130,611 | McBurdick | Sept. 20, 1938 |
| 2,215,148 | Ehrler et al. | Sept. 17, 1940 |
| 2,593,957 | Aller | Apr. 22, 1952 |
| 2,594,136 | Di Maggio | Apr. 22, 1952 |
| 2,626,464 | Menesson | Jan. 27, 1953 |